(12) United States Patent
Kim et al.

(10) Patent No.: US 10,580,576 B2
(45) Date of Patent: Mar. 3, 2020

(54) DIELECTRIC POWDER AND MULTILAYER CERAMIC ELECTRONIC COMPONENT USING THE SAME

(71) Applicant: SAMSUNG ELECTRO-MECHANICS CO., LTD., Suwon-si, Gyeonggi-do (KR)

(72) Inventors: Jin Woo Kim, Suwon-si (KR); Chang Hak Choi, Suwon-si (KR); Kang Heon Hur, Suwon-si (KR); Seok Hyun Yoon, Suwon-si (KR); Seung Ho Lee, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/953,942

(22) Filed: Apr. 16, 2018

(65) Prior Publication Data

US 2019/0066920 A1 Feb. 28, 2019

(30) Foreign Application Priority Data

Aug. 28, 2017 (KR) .................. 10-2017-0108794

(51) Int. Cl.
*H01B 1/08* (2006.01)
*H01G 4/12* (2006.01)
(Continued)

(52) U.S. Cl.
CPC ......... *H01G 4/1281* (2013.01); *C01G 23/006* (2013.01); *C04B 35/462* (2013.01);
(Continued)

(58) Field of Classification Search
CPC .. H01G 4/1227; H01G 4/1245; H01G 4/1263; H01G 4/1281; H01G 4/248;
(Continued)

(56) References Cited

U.S. PATENT DOCUMENTS 6,331,932 B1 12/2001 Kobayashi et al.
8,164,880 B2 * 4/2012 Kang .................. C04B 35/4682
361/306.1
(Continued)

FOREIGN PATENT DOCUMENTS

JP 2013-209239 A 10/2013
KR 10-2000-0057822 A 9/2000

*Primary Examiner* — Mark Kopec
*Assistant Examiner* — Jaison P Thomas
(74) *Attorney, Agent, or Firm* — Morgan, Lewis & Bockius LLP

(57) ABSTRACT

A multilayer ceramic electronic component includes: a body part including dielectric layers and internal electrodes disposed to face each other with respective dielectric layers interposed therebetween; and external electrodes disposed on an outer surface of the body part and electrically connected to the internal electrodes. The dielectric layer includes grains including: a semiconductive or conductive grain core region containing a base material represented by $ABO_3$, where A is at least one of Ba, Sr, and Ca, and B is at least one of Ti, Zr, and Hf, and a doping material including a rare earth element; and an insulating grain shell region enclosing the grain core region.

20 Claims, 3 Drawing Sheets

(51) Int. Cl.
*H01G 4/30* (2006.01)
*C04B 35/628* (2006.01)
*C04B 35/462* (2006.01)
*C04B 35/468* (2006.01)
*C04B 35/48* (2006.01)
*C04B 35/465* (2006.01)
*C04B 35/47* (2006.01)
*C01G 23/00* (2006.01)
*H01G 4/248* (2006.01)

(52) U.S. Cl.
CPC ........ *C04B 35/465* (2013.01); *C04B 35/4682* (2013.01); *C04B 35/47* (2013.01); *C04B 35/48* (2013.01); *C04B 35/6281* (2013.01); *C04B 35/62802* (2013.01); *C04B 35/62818* (2013.01); *C04B 35/62821* (2013.01); *C04B 35/62823* (2013.01); *C04B 35/62894* (2013.01); *H01B 1/08* (2013.01); *H01G 4/1227* (2013.01); *H01G 4/1245* (2013.01); *H01G 4/30* (2013.01); *C01P 2002/54* (2013.01); *C01P 2004/64* (2013.01); *C01P 2004/84* (2013.01); *C04B 2235/3201* (2013.01); *C04B 2235/3203* (2013.01); *C04B 2235/3206* (2013.01); *C04B 2235/3208* (2013.01); *C04B 2235/3213* (2013.01); *C04B 2235/3215* (2013.01); *C04B 2235/3217* (2013.01); *C04B 2235/3224* (2013.01); *C04B 2235/3225* (2013.01); *C04B 2235/3227* (2013.01); *C04B 2235/3236* (2013.01); *C04B 2235/3239* (2013.01); *C04B 2235/3244* (2013.01); *C04B 2235/3249* (2013.01); *C04B 2235/3251* (2013.01); *C04B 2235/3262* (2013.01); *C04B 2235/3409* (2013.01); *C04B 2235/3418* (2013.01); *C04B 2235/5454* (2013.01); *C04B 2235/781* (2013.01); *C04B 2235/785* (2013.01); *C04B 2235/85* (2013.01); *H01G 4/1263* (2013.01); *H01G 4/248* (2013.01)

(58) Field of Classification Search
CPC ..... H01G 4/30; C01G 23/006; C01P 2002/54; C01P 2004/64; C01P 2004/84; C04B 2235/3201; C04B 2235/3203; C04B 2235/3206; C04B 2235/3208; C04B 2235/3213; C04B 2235/3215; C04B 2235/3217; C04B 2235/3224; C04B 2235/3225; C04B 2235/3227; C04B 2235/3236; C04B 2235/3239; C04B 2235/3244; C04B 2235/3249; C04B 2235/3251; C04B 2235/3262; C04B 2235/3409; C04B 2235/3418; C04B 2235/5454; C04B 2235/781; C04B 2235/785; C04B 2235/85; C04B 35/462; C04B 35/465; C04B 35/4682; C04B 35/47; C04B 35/48; C04B 35/62802; C04B 35/6281; C04B 35/62818; C04B 35/62821; C04B 35/62823; C04B 35/62894; H01B 1/08
See application file for complete search history.

(56) References Cited

U.S. PATENT DOCUMENTS

| | | | |
|---|---|---|---|
| 9,424,991 B2 * | 8/2016 | Yoon | H01G 4/30 |
| 2008/0266751 A1 * | 10/2008 | Yamazaki | C04B 35/4682 |
| | | | 361/321.4 |
| 2010/0014214 A1 * | 1/2010 | Yamazaki | B32B 18/00 |
| | | | 361/321.4 |
| 2013/0222968 A1 * | 8/2013 | Koga | C01G 23/006 |
| | | | 361/301.4 |
| 2014/0078642 A1 * | 3/2014 | Shinichi | H01B 3/12 |
| | | | 361/301.4 |
| 2015/0011029 A1 * | 1/2015 | Mangum | C09K 11/02 |
| | | | 438/22 |
| 2016/0086735 A1 * | 3/2016 | Yoon | H01G 4/30 |
| | | | 361/301.4 |
| 2017/0221648 A1 * | 8/2017 | Rolin | C04B 35/4682 |

* cited by examiner

DIELECTRIC POWDER AND MULTILAYER CERAMIC ELECTRONIC COMPONENT USING THE SAME

CROSS-REFERENCE TO RELATED APPLICATION(S)

This application claims the benefit of priority to Korean Patent Application No. 10-2017-0108794, filed on Aug. 28, 2017 in the Korean Intellectual Property Office, the disclosure of which is incorporated herein by reference in its entirety.

BACKGROUND

1. Field

The present disclosure relates to a dielectric powder and a multilayer ceramic electronic component using the same.

2. Description of Related Art

In general, a multilayer ceramic capacitor (MLCC) is an electronic component having advantages such as a small size, high capacitance, and ease of mountability, and is a chip type condenser mounted on the circuit boards of various types of electronic products such as mobile communications terminals, notebook personal computers (PCs), computers, personal digital assistants (PDAs), and the like, serving to charge and discharge electricity.

In accordance with the recent trend for increases in the speed and the miniaturization of electronic products, microminiaturization and super high capacitance have been required in a multilayer ceramic electronic component as described above. However, there is a limitation in the number of dielectric layers that can be stacked in the multilayer ceramic electronic component, and thus, there is a limitation in increasing capacitance. Therefore, in order to implement high permittivity at the same size as a microproduct, there is a need to implement high permittivity in the dielectric material itself.

Further, due to fine particle size of the dielectric material, in a case of performing complete sintering, grain growth may be accompanied, and thus, it may be difficult to secure effective capacitance in a direct current (DC) electric field. Therefore, there is a need to develop a dielectric composition which does not accompany grain growth even at a high temperature and may simultaneously alleviate a decrease in permittivity caused when the grain growth is not accompanied.

SUMMARY

An aspect of the present disclosure may provide a dielectric powder having high permittivity and high reliability and a multilayer ceramic electronic component using the same.

According to an aspect of the present disclosure, a dielectric powder may include a semiconductive or conductive core region containing a base material represented by $ABO_3$, where A is at least one of Ba, Sr, and Ca, and B is at least one of Ti, Zr, and Hf, and a doping material including a rare earth element; and an insulating shell region enclosing the core region.

According to another aspect of the present disclosure, a multilayer ceramic electronic component may include: a body part including dielectric layers and internal electrodes disposed to face each other with respective dielectric layers interposed therebetween; and external electrodes disposed on an outer surface of the body part and electrically connected to the internal electrodes, wherein the dielectric layer includes grains including: a semiconductive or conductive grain core region containing a base material represented by $ABO_3$, where A is at least one of Ba, Sr, and Ca, and B is at least one of Ti, Zr, and Hf, and a doping material including a rare earth element; and an insulating grain shell region enclosing the grain core region.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings.

Dielectric Powder

Figure 1:
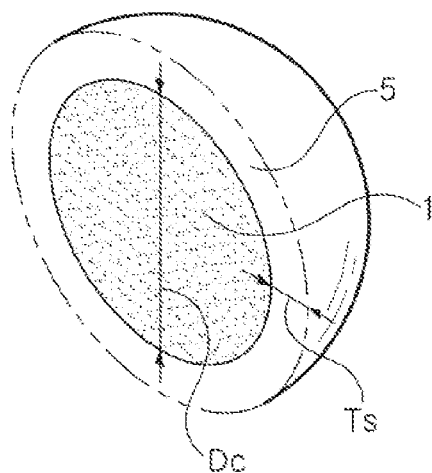
FIG. 1 is a schematic perspective view illustrating a portion of a dielectric powder according to an exemplary embodiment in the present disclosure.

FIG. 1 is a schematic perspective view illustrating a portion of a dielectric powder according to an exemplary embodiment in the present disclosure.

Referring to FIG. 1, a dielectric powder 10 may include a core region 1 and a shell region 5. The dielectric powder 10 may have a core-shell structure. The dielectric powder 10 may have a shape of a small sphere of which an average diameter is smaller than 100 nm, for example, in a range of 30 nm to 80 nm. Therefore, in a sintered substance prepared by sintering the dielectric powder 10, a grain may be prepared to have a relatively small size.

The core region 1 may be a semiconductive or conductive region. Specific resistance of the core region 1 may be, for example, several to several tens ohms ($\Omega$m). The core region 1 may have a shape of a sphere.

The core region 1 may contain a base material having a perovskite structure represented by $ABO_3$ and a doping material including a rare earth material. Here, A may be at least one of Ba, Sr, and Ca, and B may be at least one of Ti, Zr, and Hf. For example, the base material may be one of $BaTiO_3$, $SrTiO_3$, $(Ba_{1-x}Sr_x)TiO_3$, $(Ba_{1-x}Ca_x)TiO_3$, $Ba(Ti_{1-y}Hf_y)O_3$, $(Ba_{1-x}Sr_x)(Ti_{1-y}Zr_y)O_3$, and $Ba(Ti_{1-y}Zr_y)O_3$.

The rare earth element may be contained in the core region 1 in order to allow the dielectric power to have conductivity or semi-conductivity. The rare earth element may be substituted with Ba or Sr of the base material. The rare earth element may be at least one of Dy, Ho, Sm, La, Gd, Er, and Y and may have an oxidation number of +3. The rare earth element may be contained in a content of 1 mol % to 10 mol % in the core region 1, based on a total mol % of the core region.

The shell region 5 may be an insulating region. The shell region 5 may be disposed to enclose the core region 1. In order to secure high permittivity, a diameter $D_C$ of the core region 1 may be greater than or equal to a thickness $T_S$ of the shell region 5. A ratio of the diameter $D_C$ of the core region 1 and the thickness $T_S$ of the shell region 5 may be, for example, in a range of about 2.5:1 to 4:1.

The shell region 5 may contain a base material having a perovskite structure represented by $ABO_3$ and accessory ingredients. Here, A may be at least one of Ba, Sr, and Ca, and B may be at least one of Ti, Zr, and Hf. For example, the base material may be one of $BaTiO_3$, $SrTiO_3$, $(Ba_{1-x}Sr_x)TiO_3$, $(Ba_{1-x}Ca_x)TiO_3$, $Ba(Ti_{1-y}Hf_y)O_3$, $(Ba_{1-x}Sr_x)(Ti_{1-y}Zr_y)O_3$, and $Ba(Ti_{1-y}Zr_y)O_3$, and may be equal to or different from that of the core region 1. The accessory ingredients may be first to fourth accessory ingredients.

A first accessory ingredient may contain at least one element of Ba, Sr, and Nb, different from an element of the base material of the core region 1. For example, when the base material of the core region 1 is $BaTiO_3$, the first accessory ingredient may contain at least one of Sr and Nb. For example, when the base material of the core region 1 is $SrTiO_3$, the first accessory ingredient may contain at least one of Ba and Nb. The first accessory ingredient may be an ingredient for increasing permittivity of the dielectric powder 10.

The second accessory ingredient may contain at least one of Si, Ba, and Al. The second accessory ingredient may be a glass ingredient and be contained for insulation characteristics of the shell region 5.

The third accessory ingredient may contain at least one of alkali metals such as Na, Li, K, and the like, and B. The third accessory ingredient may be contained as a sintering additive, and serve to decrease a sintering temperature.

The fourth accessory ingredient may contain a transition metal and contain at least one of Zr, Mg, Mn, and V. The fourth accessory ingredient may be an acceptor ingredient, and contribute to securing resistance characteristics.

Figure 2:
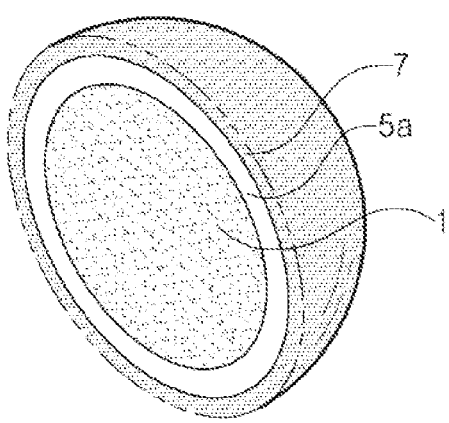
FIG. 2 is a schematic perspective view illustrating a portion of a dielectric powder according to another exemplary embodiment in the present disclosure.

FIG. 2 is a schematic perspective view illustrating a portion of a dielectric powder according to another exemplary embodiment in the present disclosure.

Referring to FIG. 2, a dielectric powder 10a may further include an outermost layer 7 in addition to a core region 1 and a shell region 5a.

The outermost layer 7 may contain the same ingredient as the first accessory ingredient of the shell region 5 of the dielectric powder 10 according to the exemplary embodiment described above. The outermost layer 7 may contain at least one element of Ba, Sr, and Nb, not contained in a base material of the core region 1. For example, when the base material of the core region 1 is $BaTiO_3$, the outermost layer 7 may contain at least one of Sr and Nb. For example, when the base material of the core region 1 is $SrTiO_3$, the outermost layer 7 may contain at least one of Ba and Nb. The outermost layer 7 may serve to increase permittivity of the dielectric powder 10a.

In this case, the shell region 5a may contain only the second to fourth accessory ingredients of the shell region 5 of the dielectric powder 10 according to the exemplary embodiment described above except for the first accessory ingredient of the shell region 5. Alternatively, the shell region 5a may contain the first accessory ingredient at a relatively low concentration. A concentration of the first accessory ingredient may be higher in the outermost layer 7 than it is in the shell region 5a. For example, the shell region 5a may contain the first accessory ingredient at a concentration of 0.1 mol % or less, based on a total mol % of the core region. That is, the dielectric powder 10a may be understood as having a structure similar to that of the dielectric powder 10 according to the exemplary embodiment described above, but having a structure in which a specific ingredient in the shell region 5 is mainly disposed in the outermost layer 7.

Hereinafter, a method for preparing a dielectric powder according to an exemplary embodiment in the present disclosure will be described.

According to the exemplary embodiment, the dielectric powders 10 and 10a may be prepared by a liquid-phase method, particularly, a hydrothermal method. First, at least one of $Ba(OH)_2$ and $Sr(OH)_2$ may be prepared and a rare earth element for doping and $TiO_2$ may be injected, followed by substitution, doping, and grain growth, thereby forming a core region 1.

Next, a seed material forming the shell region 5 or 5a and materials corresponding to the accessory ingredients may be injected, followed by grain growth, thereby forming a shell region 5 or 5a around the core region 1. The seed material may be a $BaTiO_3$ based material or $SrTiO_3$ based material.

Thereafter, according to the exemplary embodiment, an outermost layer 7 may be further formed on a surface of the shell region 5a.

Next, the dielectric powder 10 or 10a may be finally prepared by drying.

Figure 3:
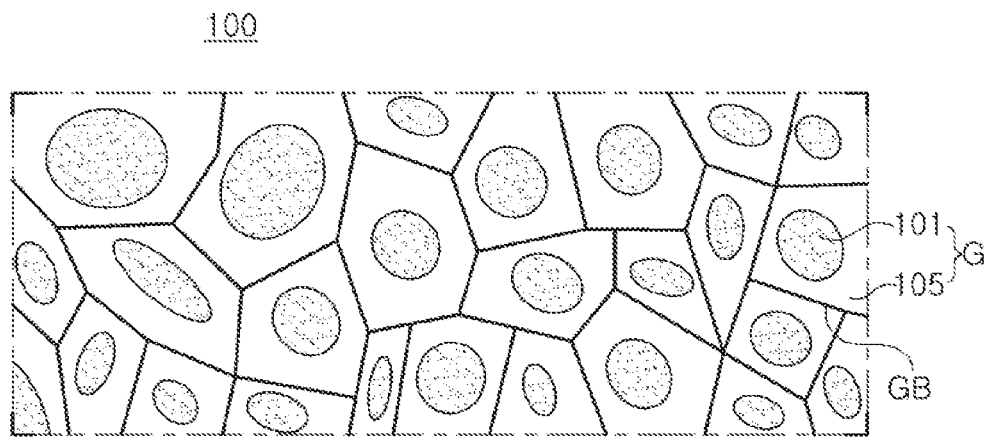
FIG. 3 is a schematic cross-sectional view illustrating a microstructure of a dielectric substance using the dielectric powder according to an exemplary embodiment in the present disclosure.

FIG. 3 is a schematic cross-sectional view illustrating a microstructure of a dielectric substance using the dielectric powder according to the exemplary embodiment in the present disclosure.

Referring to FIG. 3, a dielectric substance 100 may include grains G including grain core regions 101 and grain shell regions 105, and a ground boundary GB. The dielectric substance 100 may be a sintered substance formed by sintering the dielectric powder according to the present disclosure.

The grains G may have a polygonal shape, but are not limited thereto. In each of the grains G, the grain core regions 101 may be disposed to be enclosed by the grain shell regions 105. The grain shell regions 105 may be regions adjacent to the grain boundary GB. An average size of the grains G may be smaller than 500 nm. For example, the average size of the grains G may be in a range of 50 nm to 500 nm. The average size may mean an average of diameters of the grains G.

The grain core regions 101 may be semiconductive or conductive regions. Since the grain core region 101 includes a charge carrier therein to implement an interfacial polarization effect, the grain core region 101 may have high displacement characteristics as compared to polarization characteristics by dipoles. Therefore, high permittivity may be secured.

The grain core region 101 may be formed of an ingredient similar to that of the core region 1 of the dielectric powder 10 described above. The grain core region 101 may contain a base material having a perovskite structure represented by $ABO_3$ and a doping material including a rare earth material. Here, A may be at least one of Ba, Sr, and Ca, and B may be at least one of Ti, Zr, and Hf. The rare earth element may be at least one of Dy, Ho, Sm, La, Gd, Er, and Y and be a metal element having an oxidation number of +3. The rare earth element may be contained in a content of 1 mol % to 10 mol % in the grain core region 101, based on a total mol % of the core region.

The grain core region 101 may contain materials forming the grain shell regions 105 in a content of 0.1 mol % or less in addition to the above-mentioned ingredients.

The grain shell region 105 may be an insulating region. The grain shell region 105 may be disposed to enclose the grain core region 101. The grain shell region 105 may at least partially have insulation characteristics to compensate for a decrease in specific resistance by the grain core regions 101, such that insulation resistance characteristics may be secured.

The grain shell region 105 may be formed of ingredients similar to those of the shell region 5 of the dielectric powder 10 described above. The grain shell region 105 may contain a base material having a perovskite structure represented by $ABO_3$ and accessory ingredients. Here, A may be at least one of Ba, Sr, and Ca, and B may be at least one of Ti, Zr, and Hf. The accessory ingredients may be first to fourth accessory ingredients.

A first accessory ingredient may contain at least one element of Ba, Sr, and Nb, not contained in the base material of the grain core region 101. For example, when the base material of the grain core region 101 is $BaTiO_3$, the first accessory ingredient may contain at least one of Sr and Nb. For example, when the base material of the grain core region 101 is $SrTiO_3$, the first accessory ingredient may contain at least one of Ba and Nb.

The second accessory ingredient may contain at least one of Si, Ba, and Al. The third accessory ingredient may contain at least one of alkali metals such as Na, Li, K, and the like, and B. The fourth accessory ingredient may contain at least one of Zr, Mg, Mn, and V. According to the exemplary embodiment in the present disclosure, at least one of Ba, Sr, and Nb, the first accessory ingredient, may be contained in the dielectric substance 100 prepared by sintering the dielectric powder 10a described above with reference to FIG. 2, particularly, in the grain boundary (GB). A concentration of the first accessory ingredient may be higher in the grain boundary (GB) than in the grain shell region 105.

The grain shell region 105 may contain a relatively small amount of the material forming the grain core regions 101 in addition to the above-mentioned ingredients. This material may be diffused from the grain core region 101 to thereby be contained in the grain shell region 105. For example, the grain shell region 105 may contain the rare earth element in a content lower than 0.5 mol %, based on a total mol % of the grain shell region.

In the dielectric substance 100 as described above, the conductive or semiconductive grain core regions 101 may be disposed in each of the grains G, and the insulating grain shell regions 105 may be disposed to be connected to each other along the grain boundary GB. Therefore, high permittivity may be secured by the grain core regions 101, and resistance characteristics may be secured by the grain shell regions 105, such that effective capacitance may be secured even in a DC electric field.

Multilayer Ceramic Electronic Component

Figure 4:
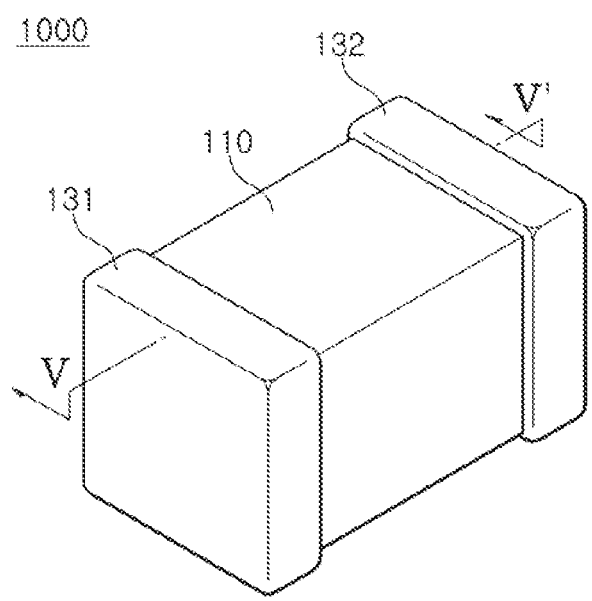
FIG. 4 is a schematic perspective view illustrating a multilayer ceramic electronic component according to an exemplary embodiment in the present disclosure.

FIG. 4 is a schematic perspective view illustrating a multilayer ceramic electronic component according to an exemplary embodiment in the present disclosure.

Figure 5:
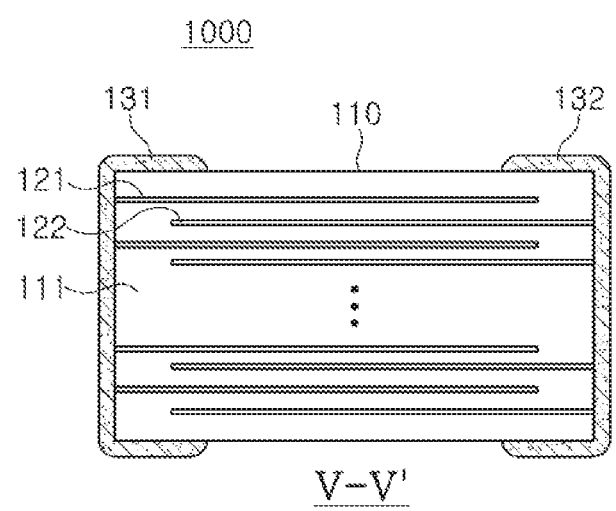
FIG. 5 is a schematic cross-sectional view of the multilayer ceramic electronic component, taken along line V-V' of FIG. 4.

FIG. 5 is a schematic cross-sectional view of the multilayer ceramic electronic component, taken along line V-V' of FIG. 4.

Referring to FIGS. 4 and 5, a multilayer ceramic capacitor 1000 according to the exemplary embodiment in the present disclosure may include a body part 110 and first and second external electrodes 131 and 132 disposed on an outer surface of the body part 110. Hereinafter, a multilayer ceramic capacitor will be described as an example of the electronic component, but the present disclosure may also be applied to various electronic products using the dielectric powder according to the present disclosure, for example, an inductor, a piezoelectric device, a varistor, a thermistor, or the like.

The body part 110 may include dielectric layers 111 and first and second internal electrodes 121 and 122 alternately stacked. The body part 110 may have, for example, a hexahedral shape.

The dielectric layers 111 may be dielectric layers formed of the dielectric substance 100 described with reference to FIG. 3. The dielectric layers 111 may be formed of a sintered substance including grains which include a semiconductive or conductive grain core region containing a base material having a perovskite structure represented by $ABO_3$ and a doping material including a rare earth element and an insulating grain shell region enclosing the grain core region. Here, A may be at least one of Ba, Sr, and Ca, and B may be at least one of Ti, Zr, and Hf.

An average thickness of the dielectric layers 111 may be 2 μm or less, for example, 0.5 μm or less, but is not limited thereto. In the dielectric layers 111 according to the exemplary embodiment in the present disclosure, the grains forming the dielectric layers 111 may be formed to have a relatively small size, such that a thickness of the dielectric layers 111 may also be significantly decreased.

The first and second internal electrodes 121 and 122 may be disposed to face each other with respective dielectric layers 111 interposed therebetween. The first and second internal electrodes 121 and 122 may be alternately stacked so that at least one side surface of each of the first internal electrodes 121 comes in contact with one end portion of the body part 110 and at least one side surface of each of the second internal electrodes 121 comes in contact with the other end portion of the body part 110. The first and second internal electrodes 121 and 122 may contain, for example, at least one of silver (Ag), lead (Pb), platinum (Pt), nickel (Ni), copper (Cu), and alloys thereof. The first and second electrode layers 121 and 122 may be formed using a conductive paste.

The first and second external electrodes 131 and 132 may be disposed to both end portions of the body part 110. The first and second external electrodes 131 and 132 may be electrically connected to the first and second internal electrodes 121 and 122, thereby configuring a capacitor circuit. The first and second external electrodes 131 and 132 may contain, for example, at least one of copper (Cu), nickel (Ni), silver (Ag), silver-palladium (Ag—Pd), and alloys thereof.

Hereinafter, a method for manufacturing a multilayer ceramic electronic component according to an exemplary embodiment of the present invention will be described.

According to the exemplary embodiment, first, ceramic green sheets may be prepared using the dielectric powder according to the present disclosure. Next, first and second internal electrodes 121 and 122 may be printed on the ceramic green sheets, respectively. Then, the ceramic green sheets on which the first and second internal electrodes 121 and 122 are printed, respectively may be stacked, compressed, and then, cut, thereby preparing a body part 110. Then, the body part 110 may be sintered. Next, first and second external electrodes 131 and 132 may be formed by terminating the sintered body part 110 using a copper (Cu) paste and sintering the formed electrodes.

As set forth above, according to exemplary embodiments in the present disclosure, a dielectric powder having high permittivity and improved reliability by having the core-shell structure including the semiconductive or conductive core and the insulating shell may be provided. Further, according to the present disclosure, the dielectric layer may have the core-shell structure including the semiconductive or conductive core and the insulating shell, such that a multilayer ceramic electronic component having improved reliability while implementing high capacitance may be implemented.

While exemplary embodiments have been shown and described above, it will be apparent to those skilled in the art that modifications and variations could be made without departing from the scope of the present invention as defined by the appended claims.

What is claimed is:

1. A dielectric powder comprising:
a semiconductive or conductive core region containing a base material represented by $ABO_3$, where A includes at least one of Ba, Sr, or Ca, and B includes at least one of Ti, Zr, or Hf, and a doping material including a rare earth element; and
an insulating shell region enclosing the core region,
wherein the shell region contains a first accessory ingredient including at least one element of Ba, Sr, or Nb, different from an element of the base material.

2. The dielectric powder of claim 1, wherein the base material includes $BaTiO_3$, and the first accessory ingredient includes at least one of Sr or Nb.

3. The dielectric powder of claim 1, wherein the doping material includes at least one of Dy, Ho, Sm, La, Gd, Er, or Y.

4. The dielectric powder of claim 1, wherein the doping material is doped in the core region in a content of 1 mol % to 10 mol %, based on a total mol % of the core region.

5. The dielectric powder of claim 1, wherein the shell region contains:
a second accessory ingredient containing at least one of Si, Ba, or Al;
a third accessory ingredient containing at least one of Na, Li, K, or B; and
a fourth accessory ingredient containing at least one of Zr, Mg, Mn, or V.

6. The dielectric powder of claim 1, wherein a ratio of a diameter of the core region to a thickness of the shell region is within a range of about 2.5:1 to 4:1.

7. The dielectric powder of claim 1, further comprising an outermost layer containing the first accessory ingredient including at least one element of Ba, Sr, or Nb, different from an element of the base material.

8. The dielectric powder of claim 7, wherein a concentration of the first accessory ingredient in the outermost layer is higher than a concentration of the first accessory ingredient in the shell region.

9. A multilayer ceramic electronic component comprising:
a body part including dielectric layers and internal electrodes disposed to face each other with respective dielectric layers interposed therebetween; and
external electrodes disposed on an outer surface of the body part and electrically connected to the internal electrodes,
wherein the dielectric layer includes grains including:
a semiconductive or conductive grain core region containing a base material represented by $ABO_3$, where A includes at least one of Ba, Sr, or Ca, and B includes at least one of Ti, Zr, or Hf, and a doping material including a rare earth element; and
an insulating grain shell region enclosing the grain core region,
wherein the grain shell region contains a first accessory ingredient including at least one element of Ba, Sr, or Nb, different from an element of the base material.

10. The multilayer ceramic electronic component of claim 9, wherein the base material includes $BaTiO_3$, and the first accessory ingredient includes at least one of Sr or Nb.

11. The multilayer ceramic electronic component of claim 9, wherein the base material includes $SrTiO_3$, and the first accessory ingredient includes at least one of Ba or Nb.

12. The multilayer ceramic electronic component of claim 9, wherein an average size of the grains is 50 nm to 500 nm.

13. The multilayer ceramic electronic component of claim 9, wherein the doping material includes at least one of Dy, Ho, Sm, La, Gd, Er, or Y.

14. The multilayer ceramic electronic component of claim 9, wherein the doping material is contained in the grain core region in a content of 1 mol % to 10 mol %, based on a total mol % of the grain core region.

15. The multilayer ceramic electronic component of claim 9, wherein the grain shell region also contains the doping material, and
a concentration of the doping material in the grain shell region is lower than a concentration of the doping material in the grain core region.

16. The multilayer ceramic electronic component of claim 15, wherein the doping material is contained in the grain shell region in a content lower than 0.5 mol %, based on a total mol % of the grain shell region.

17. The multilayer ceramic electronic component of claim 9, wherein the grain shell region contains:
a second accessory ingredient containing at least one of Si, Ba, or Al;
a third accessory ingredient containing at least one of Na, Li, K, or B; and
a fourth accessory ingredient containing at least one of Zr, Mg, Mn, or V.

18. The multilayer ceramic electronic component of claim 9, wherein the dielectric layer further comprises a grain boundary, and a concentration of the first accessory ingredient including at least one element of Ba, Sr, or Nb, different from an element of the base material, is higher in the grain boundary than a concentration of the first accessory ingredient in the grain shell region.

19. A dielectric powder comprising:
a semiconductive or conductive core region containing a base material represented by $ABO_3$, where A includes at least one of Ba, Sr, or Ca, and B includes at least one of Ti, Zr, or Hf, and a doping material including a rare earth element; and
an insulating shell region enclosing the core region,
wherein the shell region contains:
a second accessory ingredient containing at least one of Si, Ba, or Al;
a third accessory ingredient containing at least one of Na, Li, K, or B; and
a fourth accessory ingredient containing at least one of Zr, Mg, Mn, or V.

20. A multilayer ceramic electronic component comprising:
a body part including dielectric layers and internal electrodes disposed to face each other with respective dielectric layers interposed therebetween; and
external electrodes disposed on an outer surface of the body part and electrically connected to the internal electrodes, wherein the dielectric layer includes grains including:

a semiconductive or conductive grain core region containing a base material represented by $ABO_3$, where A includes at least one of Ba, Sr, or Ca, and B includes at least one of Ti, Zr, or Hf, and a doping material including a rare earth element; and an insulating grain shell region enclosing the grain core region, wherein the grain shell region contains:

a second accessory ingredient containing at least one of Si, Ba, or Al;

a third accessory ingredient containing at least one of Na, Li, K, or B; and a fourth accessory ingredient containing at least one of Zr, Mg, Mn, or V.

* * * * *